US011765316B2

(12) United States Patent
Sohoni (10) Patent No.: US 11,765,316 B2
(45) Date of Patent: Sep. 19, 2023

(54) FAST IN-PLACE FMP4 TO MP4 CONVERSION

(71) Applicant: Microsoft Technology Licensing, LLC, Redmond, WA (US)

(72) Inventor: Sudhanshu Uday Sohoni, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 17/063,691

(22) Filed: Oct. 5, 2020

(65) Prior Publication Data

US 2022/0109806 A1   Apr. 7, 2022

(51) Int. Cl.
  *H04N 5/92*   (2006.01)
  *G11B 27/34*  (2006.01)
  *H04N 5/77*   (2006.01)
  *H04N 7/01*   (2006.01)
  *H04N 7/15*   (2006.01)

(52) U.S. Cl.
  CPC .............. *H04N 5/92* (2013.01); *G11B 27/34* (2013.01); *H04N 5/77* (2013.01); *H04N 7/01* (2013.01); *H04N 7/155* (2013.01)

(58) Field of Classification Search
  CPC ... H04N 5/92; H04N 5/77; H04N 7/01; G11B 27/34
  See application file for complete search history.

(56) References Cited

U.S. PATENT DOCUMENTS

| 9,888,051 | B1 | 2/2018 | Rosenzweig et al. |
| 2005/0169303 | A1* | 8/2005 | Toma ................. H04N 21/2404 375/E7.267 |
| 2012/0265853 | A1 | 10/2012 | Knox et al. |
| 2017/0093939 | A1 | 3/2017 | Bar-mashiah et al. |
| 2020/0396504 | A1* | 12/2020 | Yin ..................... H04N 21/435 |

FOREIGN PATENT DOCUMENTS

| CN | 105447168 A | 3/2016 |
| CN | 111083410 A | 4/2020 |

OTHER PUBLICATIONS

"International Search Report and Written Opinion Issued in PCT Application No. PCT/US21/044107", dated Oct. 28, 2021, 9 Pages.

(Continued)

*Primary Examiner* — Mishawn N. Hunter
(74) *Attorney, Agent, or Firm* — WORKMAN NYDEGGER (57) ABSTRACT

In-place conversion of a fragmented MP4 (FMP4) file into an MP4 format without having to create separate files is discussed herein. Audio and visual data is captured by a multimedia application and stored an FMP4 file with an initial moov atom and one or more fragment headers assigned to portions of the audio/video data. Once a capturing session is completed (e.g., user stops recording audio and video), the FMP4 file is converted to an MP4 file by attaching a final moov atom to the FMP4 file and changing the header designation of the initial moov(i) atom from "moov" to an "mdat" designation. This change in designation makes the initial moov(i) atom of the FMP4 file opaque a media player and converts the FMP4 file to MP4 format.

20 Claims, 8 Drawing Sheets

(56) References Cited

OTHER PUBLICATIONS

"Configure Recording File Size and Type", Retrieved From: https://www.epiphan.com/userguides/VGADVI-recorder-pro/Content/UserGuides/Streaming/record/recordConfigure.htm, Retrieved Date: Sep. 8, 2020, 4 Pages.

"How to Repair Unplayable Video Files Recorded with Your Phone, Drone or Digital Camera?", Retrieved From: https://tehnoblog.org/video-repair-guide-corrupted-mp4-avi-h264-file-fix/, May 17, 2017, 30 Pages.

"Information Technology—Coding of Audio-Visual Objects—Part 14: MP4 File Format", Retrieved From: https://www.iso.org/standard/38538.html, Nov. 2003, 3 Pages.

"Packaging for Unified Origin", Retrieved From: http://web.archive.org/web/20140417192046/https:/docs.unified-streaming.com/documentation/package/package.html, Apr. 17, 2014, 6 Pages.

\* cited by examiner

|            | 00 01 02 03 04 05 06 07 08 09 0A 0B 0C 0D 0E 0F | |
|---|---|---|
| 00000054 | 01 3E E5 B4 6D 64 61 74 00 00 00 78 6D 76 68 64 | .>å´moov..xmvhd |
| 00000064 | 01 00 00 00 00 00 00 00 DB 57 67 24 00 00 00 00 | ........ÛWg$.... |
| 00000074 | DB 57 67 24 00 00 75 30 00 00 00 00 00 00 00 00 | ÛWg$..u0........ |
| 00000084 | 00 01 00 00 01 00 00 00 00 00 00 00 00 00 00 00 | ................ |
| 00000094 | 00 01 00 00 00 00 00 00 00 00 00 00 00 00 00 00 | ................ |
| 000000A4 | 00 01 00 00 00 00 00 00 00 00 00 00 00 00 00 00 | ................ |
| 000000B4 | 40 00 00 00 00 00 00 00 00 00 00 00 00 00 00 00 | @............... |
| 000000C4 | 00 00 00 00 00 00 00 00 00 00 00 00 00 00 00 03 | ................ |
| 000000D4 | 00 00 01 F7 74 72 61 6B 00 00 00 5C 74 6B 68 64 | ...÷trak...\tkhd |
| 000000E4 | 00 00 00 01 DB 57 67 24 DB 57 67 24 00 00 00 01 | ....ÛWg$ÛWg$.... |
| 000000F4 | 00 00 00 00 00 00 00 00 00 00 00 00 00 00 00 00 | ................ |
| 00000104 | 00 00 00 00 00 00 00 00 00 01 00 00 00 00 00 00 | ................ |
| 00000114 | 00 00 00 00 00 00 00 00 00 01 00 00 00 00 00 00 | ................ |
| 00000124 | 00 00 00 00 00 00 00 00 40 00 00 00 05 00 00 00 | ........@....... |
| 00000134 | 02 D0 00 00 00 00 01 93 6D 64 69 61 00 00 00 20 | .Ð......mdia... |
| 00000144 | 6D 64 68 64 00 00 00 00 DB 57 67 24 DB 57 67 24 | mdhd....ÛWg$ÛWg$ |
| 00000154 | 00 00 75 30 00 00 00 00 05 5C 4 00 00 00 00 2D | ..u0.....\Ä..... |
| 00000164 | 68 64 6C 72 00 00 00 00 00 00 00 00 76 69 64 65 | hdlr........vide |
| 00000174 | 00 00 00 00 00 00 00 00 00 00 00 00 56 69 64 65 | ............Vide |
| 00000184 | 6F 48 61 6E 64 6C 65 72 00 00 00 01 3E 6D 69 6E | oHandler....>min |
| 00000194 | 66 00 00 00 14 76 6D 68 64 00 00 00 01 00 00 00 | f....vmhd....... |
| 000001A4 | 00 00 00 00 00 00 00 00 24 64 69 6E 66 00 00 00 | ........$dingf... |
| 000001B4 | 1C 64 72 65 66 00 00 00 00 00 00 00 01 00 00 00 | .dref........... |
| 000001C4 | 0C 75 72 6C 20 00 00 00 01 00 00 00 FE 73 74 62 | .url .......pstb |
| 000001D4 | 6C 00 00 00 A2 73 74 73 64 00 00 00 00 00 00 00 | l...¢stsd....... |
| 000001E4 | 01 00 00 00 92 61 76 63 31 00 00 00 00 00 00 00 | .....avc1....... |
| 000001F4 | 01 00 00 00 00 00 00 00 00 00 00 00 00 00 00 00 | ................ |
| 00000204 | 00 05 00 02 D0 00 48 00 00 00 48 00 00 00 00 00 | ....Ð.H...H..... |
| 00000214 | 00 00 01 0A 41 56 43 23 43 6F 64 69 6E 67 00 00 | ....AVC#Coding.. |
| 00000224 | 00 00 00 00 00 00 00 00 00 00 00 00 00 00 00 00 | ................ |
| 00000234 | 00 00 00 00 18 FF FF 00 00 00 3C 61 76 63 43 01 | .....ÿÿ...<avcC. |
| 00000244 | 4D 00 1F FF E1 00 24 27 4D 00 1F 95 A0 14 01 24 | M..ÿá.$'M... ..$ |
| 00000254 | C0 50 20 00 00 03 00 20 00 00 07 9D 08 00 3C 44 | ÁP ... ......<D |
| 00000264 | 00 00 F1 16 F7 BD F0 76 87 0C A8 01 00 05 28 EE | ..ñ.÷½ðv..¨...(î |
| 00000274 | 3C 80 00 00 00 00 10 73 74 74 73 00 00 00 00 00 | <......stts..... |
| 00000284 | 00 00 00 00 00 00 10 73 74 73 63 00 00 00 00 00 | .......stsc..... |
| 00000294 | 00 00 00 00 00 00 14 73 74 73 7A 00 00 00 00 00 | .......stsz..... |
| 000002A4 | 00 00 00 00 00 00 00 00 10 73 74 63 6F 00 | ........stco. |
| 000002B4 | 00 00 00 00 00 00 00 00 10 73 74 73 73 00 | .........stss. |
| 000002C4 | 00 00 00 00 00 00 00 00 01 B5 74 72 61 68 00 | .........µtrak. |
| 000002D4 | 00 00 5C 74 6B 68 64 00 00 00 01 DB 57 67 24 DB | ..\tkhd....ÛWg$Û |
| 000002E4 | 57 67 24 00 00 00 02 00 00 00 00 00 00 00 00 00 | Wg$............. |
| 000002F4 | 00 00 00 00 00 00 00 00 00 00 01 00 00 00 00 00 | ................ |
| 00000304 | 01 00 00 00 00 00 00 00 00 00 00 00 00 00 00 00 | ................ |
| 00000314 | 01 00 00 00 00 00 00 00 00 00 00 00 00 00 00 40 | ...............@ |

FAST IN-PLACE FMP4 TO MP4 CONVERSION

BACKGROUND

The Moving Picture Experts Group (MPEG) has defined a number of multimedia standards, including the widely popular MPEG-4 Part 14 standard (commonly referred to as simply "MP4"). MP4 is a digital multimedia container format used to store audio-visual files, and as more and more users come online, the MP4 standard has become the go-to standard for storing multimedia files. Numerous multimedia applications allow users to play and record audio-visual files as MP4 files that are easily shareable. Most users today have no or little idea how these applications create MP4 files To record content as an MP4 file, a user typically hits a record button that begins capturing audio and video (audio/video) data. When done, the user stops the recording, triggering the multimedia application to perform several complex operations to finalize the MP4 file. One operation that is performed during the finalization stage is the creation of a "moov" atom (commonly referred to as a "movie" atom). These moov atoms include a header with various data that is used by a multimedia player. In traditional MP4 recordings, the audio/video is rendered unplayable if the application crashes before the moov atom is written. Yet, the average user creating an MP4 file has no idea that there still is some additional processing that must occur after recording stops. Consequently, users will close the recording application before the moov atom has been written—and finalization is completed.

This becomes even more problematic for longer recordings that require more complex moov atoms, often resulting in header writing being timed out before the moov atom is completed. The recording may be lost if the moov atom is not created before the application is closed, if writing of the moov atom times out, or if there is not enough disk space to store the finalized MP4 recording. Obviously, losing a recording may be catastrophic to the user experience, especially if the recording is important.

A relatively newer variation of the MP4 format is the fragmented MP4 (FMP4) format. Instead of one single moov atom written after a recording is created, FMP4 generates several fragment headers (called "moof" atoms) for different fragments of a multimedia file. These moof atoms are interspersed throughout the recording. Yet, FMP4 has not been widely adopted, and so FMP4 files must be converted back to traditional MP4 files before being useful in multimedia players—otherwise, various player functions (e.g., playback, seek, etc.) do not work properly. This conversion process—FMP4 to MP4—is very tedious and resource intensive. The audio/video data must be copied from the FMP4 file to a newly created MP4 file, creating two instances of the data. Two copies of the same audio/video data creates a strain on processing and memory resources, or, even worse, if the adequate memory is not available for both copies of the audio/video data, the conversion may fail and the audio/video data may be lost.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed to techniques and devices configured to perform in-place conversion of an FMP4 file into MP4 format without having to create separate files. To do so, audio/visual data is recorded or otherwise accessed by a multimedia application. The recorded audio/visual data is stored in an FMP4 file, and an initial moov atom (referenced herein as "moov(i)" atom) is assigned thereto. Also, fragment headers (moof) are assigned to portions of the audio/video data. This way, if the multimedia application is closed before the FMP4 file is converted, or if a system failure occurs, at least the FMP4 file with the fragment headers is stored. But if the recording is completed (e.g., user stops recording), the FMP4 file is converted to an MP4 file. Such conversion is performed through generating and attaching a final moov atom (referenced herein as "moov(f)" atom) to the FMP4 file and also changing the header designation of the initial moov(i) atom from a "moov" designation to an "mdat" designation. Changing the header designation to mdat makes the initial moov(i) atom and fragment headers opaque to the multimedia player, effectively turning the FMP4 file into an MP4 file, without having to make multiple copies of the audio/video data.

BRIEF DESCRIPTION OF THE DRAWINGS

The disclosed implementations and examples are described in detail below with reference to the accompanying drawing figures listed below:

FIG. 5 illustrates a data file of an example FMP4 audio/visual file being converted to MP4 format using the disclosed in-place conversion, according to some of the disclosed implementations;

DETAILED DESCRIPTION

The various implementations will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The implementations and examples disclosed herein provide systems, methods, and computer-storage memory with instructions to perform in-place conversion of an FMP4 file to an MP4 file. As referenced herein, "in-place" conversion refers to modifying an existing FMP4 file to change it into MP4 format. In some implementations, in-place conversion is done by writing a new moov atom based on fragment headers of the FMP4 file and then changing the header information of an initial moov atom from "moov" to "mdat" to make the initial moov atom opaque to multimedia players. Using the disclosed techniques and devices, only one file—the FMP4 file—is necessary to generate the MP4 file. Whereas, conventional techniques for converting FMP4 to MP4 files requires creation of a new MP4 file and copying the audio/visual data of the FMP4 file to the new MP4 file, which creates two copies of the audio/visual data that doubles the memory and processing requirements. Recording a multimedia file as an FMP4 file first and then converting that FMP4 file into MP4 through the disclosed in-place conversion saves the recording—or, at least a majority of the recording—from being lost before the MP4 finalization stage. It also requires only a nominal amount of additional memory beyond the FMP4 file for conversion, cutting down on conventional processing and memory demands for FMP4-to-MP4 conversion.

FMP4 files include numerous fragment headers (moof atoms) that are interspersed and assigned to different portions (or fragments) of the recorded audio/visual data. For example, the FMP4 recording may include a first moof atom assigned to a first block of audio/visual data, a second moof atom assigned to a second block of audio/visual data, and so on. If a multimedia application recording audio/visual data (e.g., through a recording) is closed, fails, or some other issue stops the FMP4 file from being finalized, at least a portion of the audio/visual data has been stored with corresponding fragment moof atoms. Because FMP4 files generate and store fragment moof atoms with portions of the audio/visual data being recorded, those portions are effectively finalized, for the sake of the FMP4 file, once the moof atoms are assigned. So if an error occurs before the FMP4 is finalized, at least the audio/visual data of all but the last fragment has been saved. In other words, for a recording with N fragments, at least N−1 fragments have been saved because fragment moof atoms are assigned as the audio/visual data is being recorded. So using FMP4 format ensures that an entire recording is not lost just because finalization fails to complete properly—at most, just the last fragment may be lost.

Additionally, only a minimal number of resources are necessary to perform the in-place conversion of the FMP4 file to MP4 format using the disclosed implementations as examples. Once recording has stopped, a finalization sequence is performed. In some examples, the finalization sequence involves generating and attaching an MP4 moov atom to the recoded FMP4 file with information from the fragment moof atoms as well as an initial moov atom of the FMP4 file. It should be noted that this generated MP4 moov atom is attached to the FMP4 file to facilitate the in-place conversion, instead of to a new file generated from the FMP4 file data. Once the MP4 moov atom is attached to the FMP4 file, some implementations change the header of the initial moov atom of the FMP4 file, and optionally also the fragment moof headers, from "moof" designations to an "mdat" designation. The mdat designation marks the atoms as audio/visual data, instead of moov or moof atoms. Changing the header of the initial moov atom and the fragment moof headers from moof to mdat designations changes the initial moov atom and the fragment moof headers of the FMP4 file to opaque mdat atoms that are not seen or processed by a multimedia application. While this obfuscation of the initial moov and moof atoms may add some unnecessary bytes of data to the converted FMP4 file, the resource cost is far less than if the FMP4 audio/visual data was copied over to a new MP4 file.

In some implementations, the new MP4 moov atom that is added to the FMP4 file includes appropriate chunk offsets. Chunk offsets are numeric values that describe the timing offsets of audio data, video data, media data, frames, and/or samples of an MP4 file. In an MP4 file, the audio, video, and media data are written in what are known as "blurbs" or "chunks." For example, frames of video may be written; then frames of audio; then metadata; and then additional audio, video, or media data. Such an interleaving pattern creates chunks of data of each media type. The disclosed FMP4 and MP4 files may include chunk offset tables that describe the offsets of each chunk of data for a given media track.

Once the MP4 moov atom is attached and the initial FMP4 moov atom is changed to mdat, the FMP4 file has effectively been converted to a usable MP4 file. The new MP4 file may then be stored and transmitted, played, or otherwise used by various multimedia applications. Using these disclosed techniques, the FMP4 file is quickly converted to MP4 without having to perform costly copying and processing. Additionally, the newly created MP4 file is compatible with legacy players, and the MP4 file may be converted back to FMP4 anytime by changing the initial moov atom back to a moov atom through overwriting the modified mdat header.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

Figure 1:
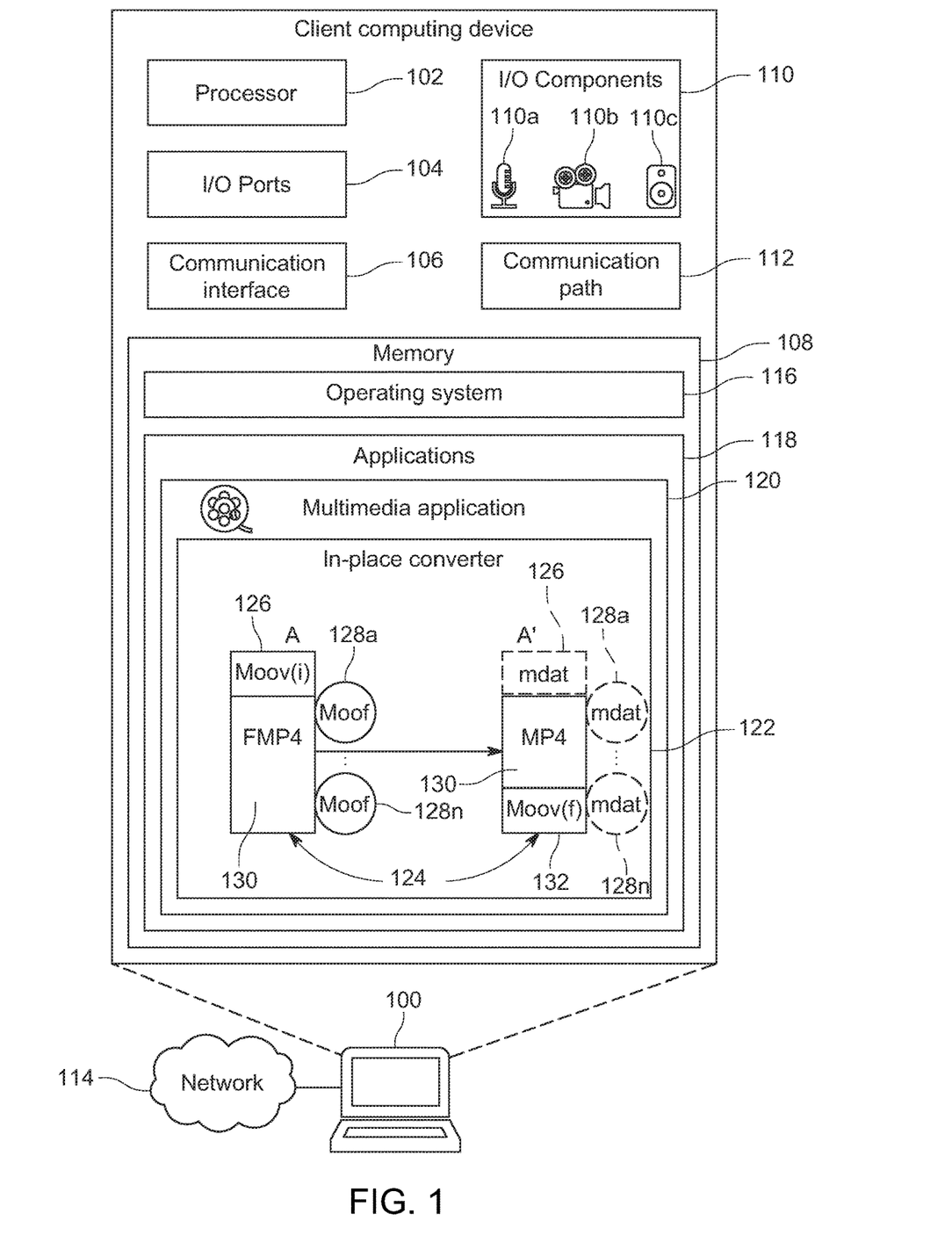
FIG. 1 illustrates a block diagram of a client computing device configured to perform in-place conversion of an FMP4 file to MP4 format, according to some of the disclosed implementations.

FIG. 1 is a block diagram of a client computing device 100 configured to perform in-place conversion of an FMP4 file to MP4 format, according to some of the disclosed implementations. Client computing device 100 includes one or more processors 102, input/output (I/O) ports 104, a communications interface 106, computer-storage memory (memory) 108, I/O components 110, and a communications path 112. The client computing device 100 is able to communicate over a network 114 with other devices or cloud computing resources.

The client computing device 100 may be any of a number of types of computing device, such as, for example but without limitation, a laptop, smartphone, tablet, virtual reality (VR) or augmented reality (AR) headset, smart watch, wearable, electronic kiosk, smart automobile, or the like. While the client computing device 100 is depicted as a single device, multiple client computing devices 100 may work together and share the depicted device resources. For instance, various processors 102 and memory 108 may be housed and distributed across multiple client computing devices 100. The client computing device 100 is but one example of a suitable computing environment and is not intended to suggest any limitation as to the scope of use or functionality of the invention.

The processor 102 includes any number of microprocessors, microcontrollers, analog circuitry, or the like for that are programmed to execute computer-executable instructions for implementing aspects of this disclosure. In some examples, the processor 102 is programmed to execute instructions such as those illustrated in the other drawings discussed herein. In some implementations, the processor 102 is programmed with instructions to function for the specialized purpose of performing the in-place conversion of an FMP4 file to MP4 format, as disclosed herein.

The I/O ports 104 connect various hardware I/O components 110 to the client computing device 100. Example I/O components 110 include, for example but without limitation, one or more microphones 110a, cameras 110b, and speakers 110c that operate to capture and present audio/visual content. The client computing device 100 may additionally or alternatively be equipped with other hardware I/O components 110, such as, for example but without limitation, displays, touch screens, AR and VR headsets, peripheral devices, joysticks, scanner, printers, etc. Such components are well known to those in the art and need not be discussed at length herein.

The communications interface 106 allows software and data to be transferred between the client computer device 100 and external devices over the network 114. The communications interface 106 may include a modem, a network interface (such as an Ethernet card), a communications port, a Personal Computer Memory Card International Association (PCMCIA) slot and card, a wireless adapter, etc. Software and data transferred via the communications interface 106 are in the form of signals that may be electronic, electromagnetic, optical, or other signals capable of being received by communications interface 106. Such signals are provided to the communications interface 106 via the communications path (e.g., channel) 112. The communications path 112 carries the signals and may be implemented using a wired, wireless, fiber optic, telephone, cellular, radio frequency (RF), or other communications channel.

The network 114 may include any computer network or combination thereof. Examples of computer networks configurable to operate as network 114 include, without limitation, a wireless network; landline; cable line; digital subscriber line (DSL): fiber-optic line; cellular network (e.g., 3G, 4G, 5G, etc.); local area network (LAN); wide area network (WAN): metropolitan area network (MAN); or the like. The network 114 is not limited, however, to connections coupling separate computer units. Rather, the network 114 may also comprise subsystems that transfer data between servers or computing devices. For example, the network 114 may also include a point-to-point connection, the Internet, an Ethernet, an electrical bus, a neural network, or other internal system. Such networking architectures are well known and need not be discussed at depth herein.

The computer-storage memory 108 includes any quantity of memory devices associated with or accessible by the client computing device 100. The computer-storage memory 108 may take the form of the computer-storage media referenced below and operatively provides storage of computer-readable code, data structures, program modules, and other code for the client computing device 100 to store and access instructions configured to carry out the various operations disclosed herein. The computer-storage memory 108 may include memory devices in the form of volatile and/or nonvolatile memory, removable or non-removable memory, data disks in virtual environments, or a combination thereof. Examples of client computing device 100 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other computer memory.

The computer-storage memory 108 may be internal to the client computing device 100 (as shown in FIG. 1), external to the client computing device 100 (not shown), or both (not shown). Additionally or alternatively, the computer-storage memory 108 may be distributed across multiple client computing devices 100 and/or servers, e.g., in a virtualized environment providing distributed processing. For the purposes of this disclosure, "computer storage media," "computer-storage memory," "memory," and "memory devices" are synonymous terms for the computer-storage media 108, and none of these terms include carrier waves or propagating signaling.

In some examples, the computer-storage memory 108 stores executable computer instructions for an operating system (OS) 116 and various software applications 118. The OS 116 may be any OS designed to the control the functionality of the client computing device 100, including, for example but without limitation: WINDOWS® developed by the MICROSOFT CORPORATION® of Redmond, Wash., MAC OS® developed by APPLE, INC.® of Cupertino, Calif., ANDROID™ developed by GOOGLE, INC.® of Mountain View, Calif., open-source LINUX®, and the like.

Among other programs, the applications 118 include a multimedia application 120 that is configured to play and capture (e.g., record) audio and/or video captured by the microphone 110a and the camera 110b, respectively, of the I/O components 110. The multimedia application 120 may be a video or audio player, a video or audio recorder, a videoconferencing application (e.g., MICROSOFT TEAMS® or the like), a video-sharing application (e.g., YOUTUBE®), or any other audio/video player. In some implementations, the multimedia application 120 provides recording functionality allowing users to capture audio and/or video being captured by the I/O components 110. Additionally or alternatively, the multimedia application 120 may also provide playback functionality for playing audio and/or video. The multimedia application 120 may comprise one or separate applications for recording audio/video data (e.g., a multimedia recorder) and one for playing back audio/video data (e.g., a multimedia player). For the sake of clarity, implementations and examples are discussed herein as capturing both audio and video (audio/video), but the same implementations may be used to perform in-place conversion of only audio or only video FMP4 files.

In operation, the multimedia application 120 records FMP4 files that contain various fragment (moof) headers are generated during recording and interspersed throughout the FMP4 files. As mentioned above, recording files in FMP4 format with fragment headers ensures that, if a failure occurs before MP4 finalization, there is at least an FMP4 file of the recording, or at least most (e.g., N-1 fragments) of the recording. For example, if a captured FMP4 file recording is 60 minutes long, with 10 separate 6 minute fragments, and only 5 of the segments have had enough time to generate and assign fragment (moof) headers before a system crash or the multimedia application 120 is closed, the resultant FMP4 file is saved before the crash or closure with at least the 5 fragments and respective 5 fragment headers. Thus, the user has an FMP4 file with at least 50 of the 60 total minutes, which is far better than losing the entire file because an MP4 moov atom could not be written before the failure/closure.

In some implementations, the multimedia application 120 includes an in-place converter 122 for converting FMP4 files to MP4 using the techniques disclosed herein. The in-place converter 122 comprises executable code instructions or firmware that performs in-place conversion of an audio/visual file 124 from FMP4 to MP4 format, without having to create a new MP4 file. For clarity, the same audio/visual file 124 is shown at two different times: before finalization (time A) and after finalization (time A'). In other words, only one audio/visual file 124 is generated, even though two instances are shown at different times A and A'. The audio/visual file 124 is not copied or recreated. Instead, the audio/visual file 124 is recorded originally in FMP4 format, and the FMP4 version of the audio/visual file 124 is modified using the techniques herein for conversion to an MP4 file. Again, though two instances of the audio/visual file are shown in FIG. 1, only one file is used.

As mentioned above, the audio/visual file 120 is captured in FMP4 format once the user begins recording, as depicted at time A. The FMP4 version of the audio/visual file 124, shown on the left at time A, originally includes audio/video data marked with an mdat designation (shown as mdat section 130), an initial FMP4 moov atom 126, and one or more fragment headers 128a-n that are assigned to different portions of the audio/visual data. Again, recording the audio/visual data and assigning the fragment headers 128a-n ensures that at least a portion (e.g., N−1 fragments) of the FMP4 survives a crash or failure.

When the recording is stopped, the in-place converter 122 modifies (either automatically or upon user prompting) the FMP4 version of the audio/visual file 124 to create the MP4 version shown at time A'. Such modification involves writing and attaching a finalized MP4 moov atom (referred to herein as "moov(f)") 132 to the FMP4 version of the audio/visual file 124 (e.g., appended at the end). In some implementations, the MP4 moov(f) atom 132 is generated, at least partially, from the initial FMP4 moov(i) atom 126 and the fragment headers 128a-n. After the MP4 moov(f) atom 132 is generated, the in-place converter 122 hides the FMP4 moov(i) atom 126 and the fragment headers 128a-n by changing their "moov" and "moof" headings to "mdat" headings. This may be done by searching for the moov and moof headings and changing them both—or at least the moov designation of the moov(i) atom 126—to an mdat designation.

Marking the FMP4 moov(i) atom 126 and the fragment headers 128a-n as mdat—instead of moov and moof, respectively—makes these atoms 126 and 128a-n opaque to the multimedia application 120. Put another way, the FMP4 moov(i) atom 126 and the fragment headers 128a-n are used to create the FMP4 recording of the audio/visual file 124, but then the headers for these atoms 126 and 128a-n are changed once the final MP4 moov(f) 132 is written. This effectively converts the FMP4 version of the audio/visual file 124 to MP4 format, albeit with the added atoms 126 and 128a-n that were changed to mdat headings, which are of minimal size and require far less processing and memory resources than if the audio/visual data needed to be written into a new file.

Figure 2:
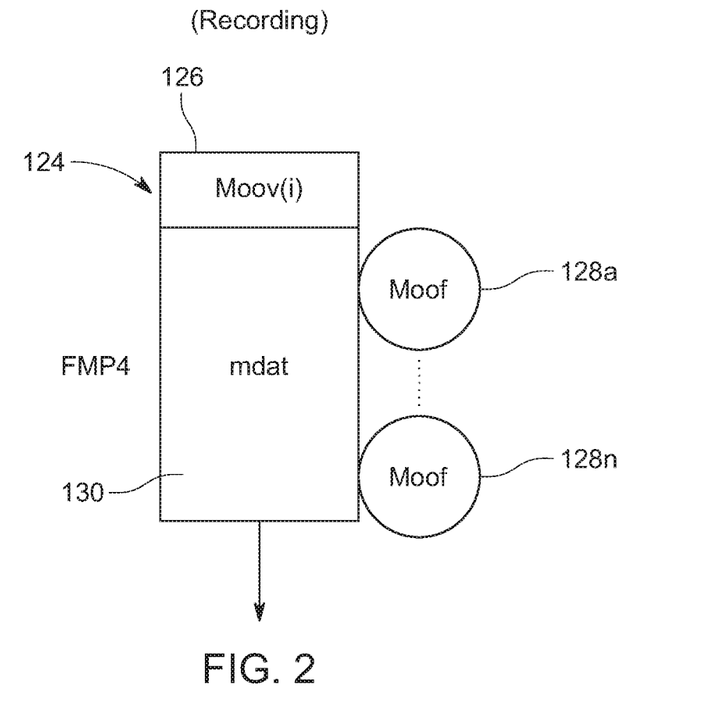
FIG. 2 illustrates a block diagram of an FMP4 version of an audio/visual file being recorded for conversion to MP4 format, according to some of the disclosed implementations.
Figure 3:
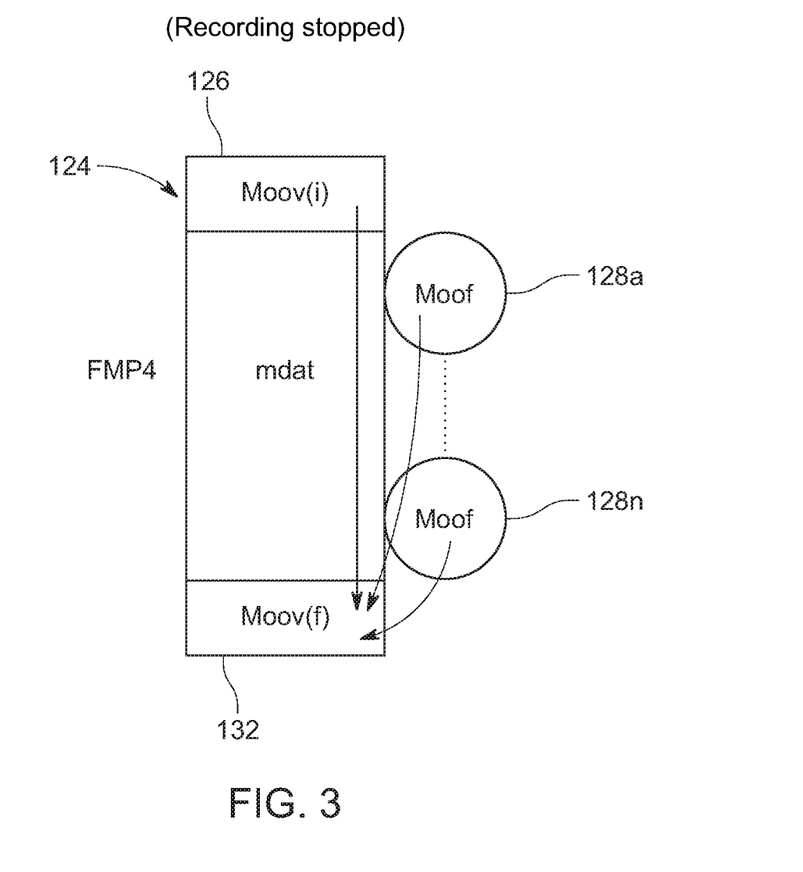
FIG. 3 illustrates a block diagram of an FMP4 version of an audio/visual file after recording, according to some of the disclosed implementations.
Figure 4:
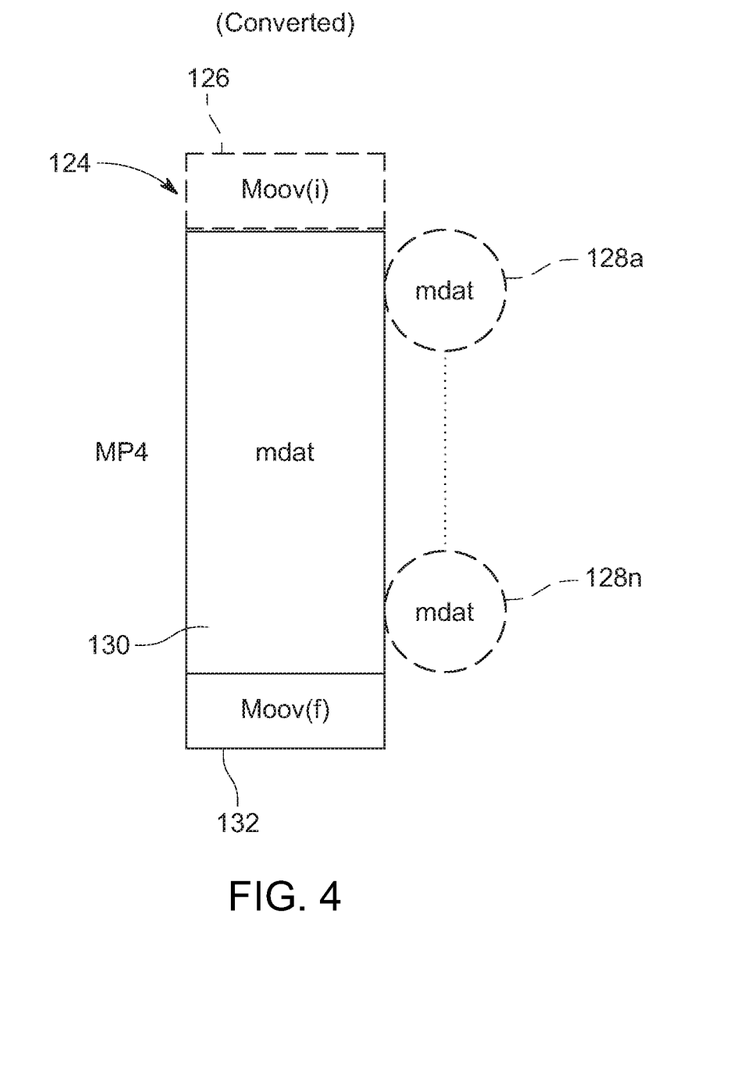
FIG. 4 illustrates a block diagram of an FMP4 version of an audio/visual file after in-place conversion to MP4 format, according to some of the disclosed implementations.

FIGS. 2-4 illustrate block diagrams showing the in-place conversion of the FMP4 version of the audio/visual file 124 to MP4 format performed by the in-place converter 122. These figures show the audio/visual file 124 at different times, progressing from recording as an FMP4 to converting to an MP4. Specifically, FIG. 2 shows the FMP4 version of the audio/visual file 124 during recording. FIG. 3 shows the FMP4 version of the audio/visual file 124 once the recording has stopped. FIG. 4 shows the MP4 version of the audio/visual file 124 created from modifying the FMP4 version.

Looking initially at FIG. 2, the audio/visual file 124 is shown being captured as an FMP4 file. A user or application 118 may have started recording audio and/or visual data. For example, the user may have selected a record option during a video conference, a video feet from a security camera at a house may have automatically started recording once a doorbell was pushed or a motion was detected, or the recording may have been started in myriad other ways. During recording, the audio/visual file 124 is initially recorded as an FMP4 file, and the initial FMP4 moov(i) atom 126 is generated and assigned thereto. Additionally, because the recording is being captured in FMP4, the various fragment headers 128a-n are generated during the recording and assigned to different audio/visual data in the mdat 130 payload. As recording continues, additional fragment headers 128 are generated and added to the audio/visual data.

FIG. 3 shows the FMP4 version of the audio/visual file 124 once recording has stopped. When the recording stops, the in-place converter 122 begins finalization by creating the final moov(f) atom 132 from the initial moov(i) atom 126 and the fragment moof atoms 128a-n. Once the final moov(f) 132 is generated and attached to the FMP4 version of the audio/visual file 124, the FMP4-to-MP4 conversion is completed by obfuscating the initial moov(i) atom 126 and the fragment headers 128a-n, as shown in FIG. 4. To do so, some implementations change the headers of the initial moov(i) atom 126 and the fragment headers 128a-n from "moov" and "moof" to "mdat." By overwriting these headers to mdat, the initial moov(i) atom 126 and the fragment headers 128a-n are made opaque to multimedia application 120 and not processed during playback. This effectively turns the FMP4 version of the audio/visual file 124 into an MP4, without having to create a new file. Also, by changing just the header of the initial moov(i) atom 126, the initial moov(i) atom 126 and the fragment headers 128a-n of the FMP4 are concealed. In other words, some implementations only change bytes in the initial moov(i) atom 126 to conceal both it and the fragment headers 128a-n.

Additionally, the newly created MP4 may also be converted back to FMP4 format by reversing the change of the initial moov(i) atom 126. In other words, the newly created MP4 file may be changed back to FMP4 by changing the initial moov(i) atom 126 back to a moov header designation from an mdat designation. Because the MP4 file includes all of the data for the initial moov(i) atom 126 and the fragment headers 128a-n, this designation change—from mdat to moov—makes the initial moov(i) atom 126 and the fragment headers 128a-n visible to the multimedia application 120.

Figure 6:
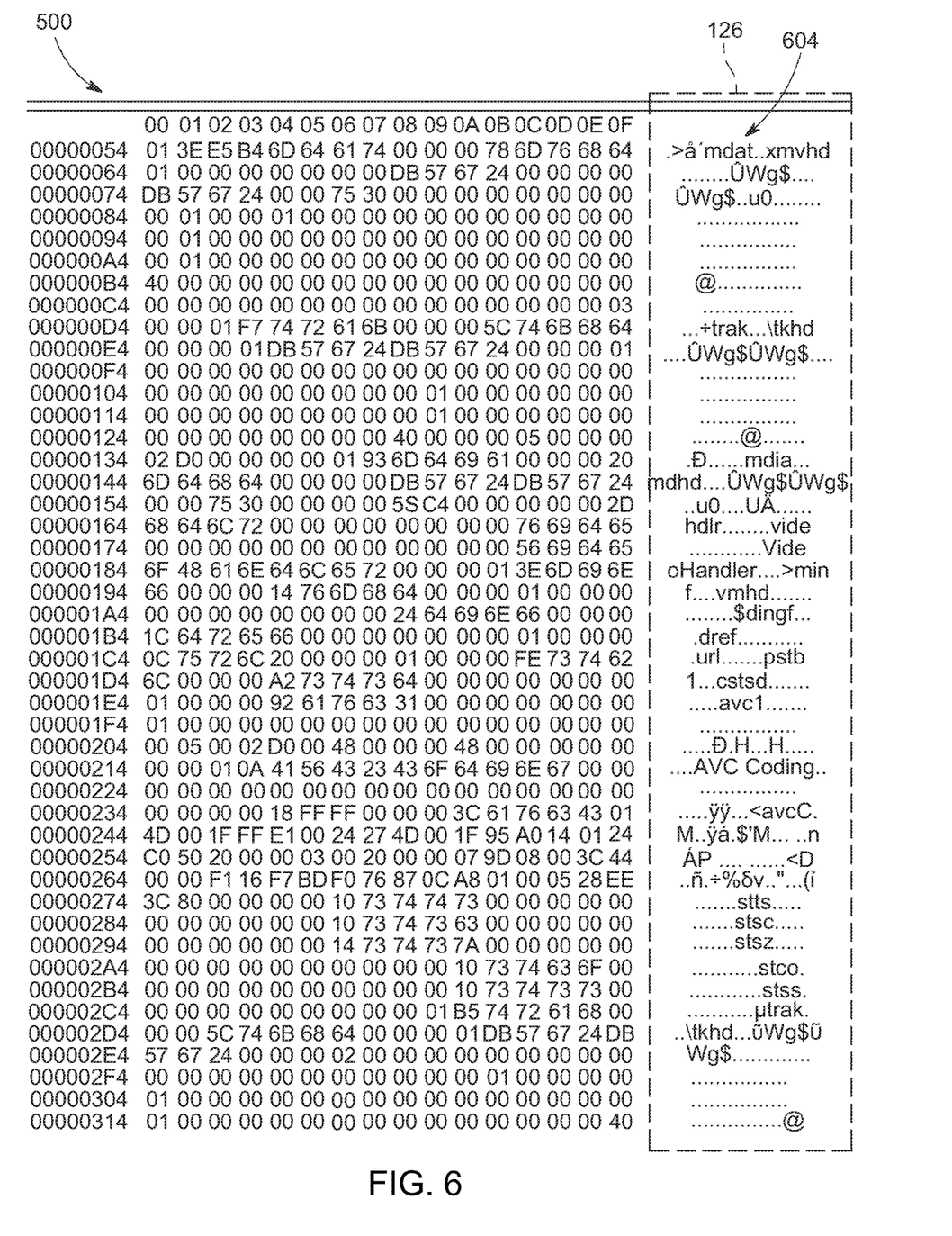
FIG. 6 illustrates a data file of an example FMP4 audio/visual file that has been modified into MP4 format, according to some of the disclosed implementations.

FIGS. 5 and 6 illustrate the modification of an FMP4 data file 500 of the audio/visual file 124 for in-place conversion to MP4 format, according to some of the disclosed implementations. As shown in FIG. 5, the data file 500 includes an initial moov(i) atom 126, depicted within the dotted box. The initial moov(i) atom 126 includes a moov header 502 that specifies atom 126 is a moov atom. In some implementations, this initial moov(i) atom 126 is originally created and the moov header 502 assigned while the audio/visual file 124 is being recorded. Stoppage of the recording triggers the in-place converter 122 to perform the disclosed in-place conversion of the FMP4 data file 500 to MP4 format.

In-place conversion of the FMP4 data file 500 to MP4 format is performed, in some implementations, by changing the moov header 502 of the data file 500 from a "moov" designation to an "mdat" designation. This change is shown in FIG. 6. As depicted, the previous moov header 502 of the initial moov(i) atom 126 has been changed to an mdat header 604 by changing "moov" to "mdat." Changing the moov header 502 to the mdat header 604 obfuscates the initial moov(i) atom 126 from the multimedia application 120. As a result, the FMP4 data file 500 is effectively converted to an MP4 file, without having to create or copy data to an entirely new file.

Figure 7:
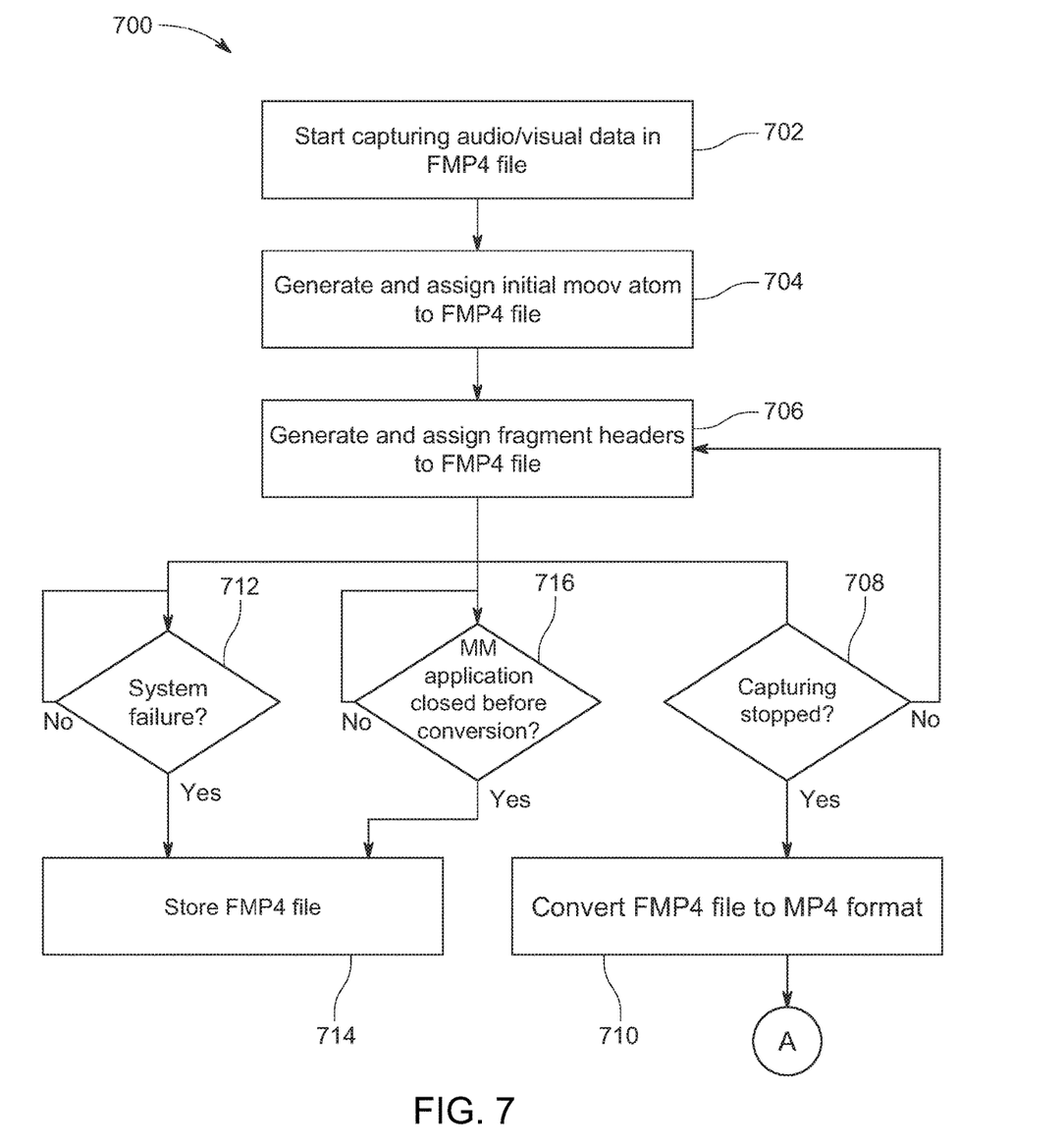
FIG. 7 illustrates a flowchart diagram of a workflow for performing in-place conversion of an FMP4 file into an MP4 file, according to some of the disclosed implementations.

FIG. 7 illustrates a flowchart diagram of a workflow 700 for performing in-place conversion of an FMP4 file into an MP4 file, according to some of the disclosed implementations. Initially, a command is received to start capturing audio/visual data, as shown at 702. This may be given by a user activating a recording feature in the multimedia application, such as in a videoconferencing application. Alternatively, audio/visual data may be captured by accessing streaming audio/video content online, recording audio/visual content using microphones and/or cameras of a client computing device 100; accessing audio/video content over the Internet; or any other way.

The audio/visual data is initially stored as an FMP4 file that is later converted to an MP4 file, as also indicated in 702, for eventual conversion to MP4 format using the disclosed in-place conversion techniques. During audio/visual data capturing, an initial moov(i) atom is generated and assigned to the FMP4 file, as shown at 704. Fragment headers are generated and assigned to different portions of the FMP4 file, as shown at 706. For example, a first moof header may be assigned to 10 minutes of audio/video data, a second moof header may be assigned to the next 10 minutes of audio/video data, and so on. Additional fragment headers are assigned to the captured audio/video data until the audio/video data stops being captured (e.g., recorded), as shown at decision box 708. When the capturing is stopped, the created FMP4 file is converted into MP4 format, as shown at 710, using the operations illustrated in FIG. 8 and referenced below, as indicated by branch connector A.

As shown at 712, if a system failure of the client computing device occurs is closed before during capture of the audio/visual data, and before the in-place conversion to MP4 format, the FMP4 file is stored as-is, as shown at 714. Similarly, as shown at 716, if the multimedia application capturing or accessing the audio/visual data is closed before conversion, the FMP4 file is stored as-is, as shown at 714. These two paths ensure that at least a portion of the audio/video data is saved and recoverable for later conversion.

Figure 8:
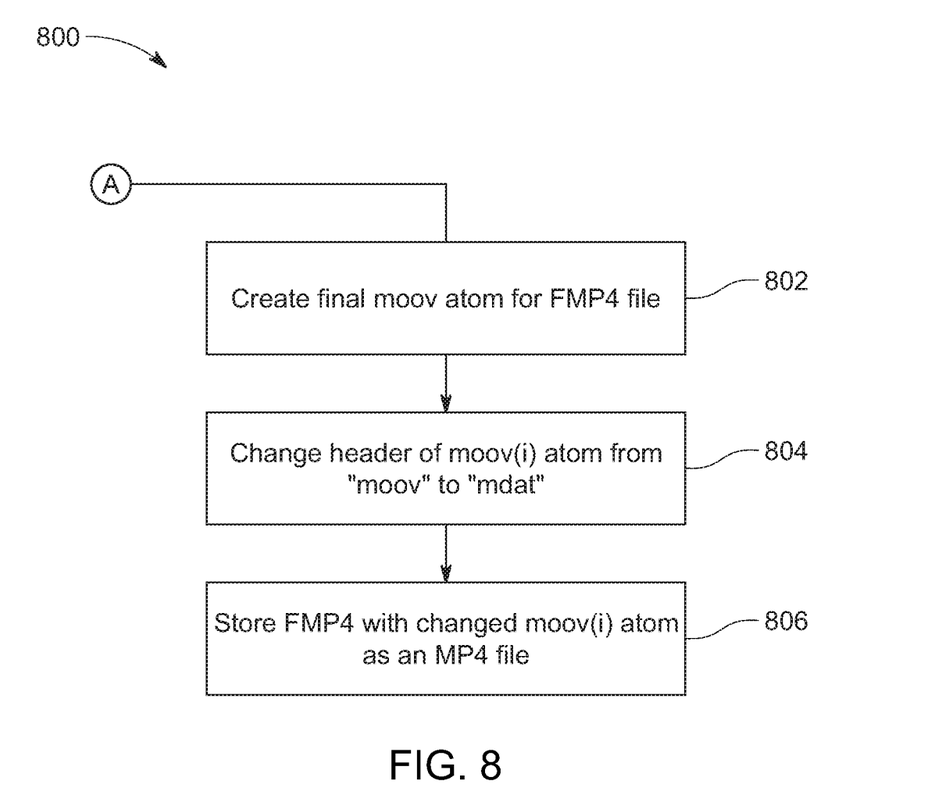
FIG. 8 illustrates a flowchart diagram of a workflow for converting an FMP4 file into an MP4 file, according to some of the disclosed implementations.

FIG. 8 illustrates a flowchart diagram of a workflow 800 for converting an FMP4 file into an MP4 file, according to some of the disclosed implementations. As previously discussed, in-place conversion of the FPM4 may begin upon stoppage of the audio/video data capturing (e.g., recording). After stoppage, a final a final moov(f) atom for the FMP4 file of the audio/visual data is created, as shown at 802. This final moov(f) atom may be generated, in part, from the initial moov(i) atom and the fragment headers of the FMP4 file. In some implementations, the final moov(f) atom is appended to otherwise attached to the FMP4.

Once attached, the in-place conversion is completed by changing the header of the initial moov(i) to an mdat designation, as shown at 804 To do so, in some implementations, the in-place converter searches for the moov(i) header in the FMP4 file and changes it to mdat. Some implementations also change the fragment headers to an mdat designation as well. Once at least the moov(i) header has been changed, the FMP4—file with attached final moov (f) atom and changed initial moov(i) atom—may be stored as an MP4 file, as indicated by 806.

The examples and implementations disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments where tasks are performed by remote-processing devices that are linked through a communications network.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device configured to perform in-place conversion of FMP4 files to MP4 format when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

ADDITIONAL EXAMPLES

Some examples are directed to a method for performing in-place conversion of a fragmented MP4 (FMP4) file into an MP4 file (workflow 700). The method comprises: capturing audio and visual data for the FMP4 file (702); during said capturing, generating an initial moov atom for the FMP4 file (704), the initial moov atom comprising a header with a moov designation; detecting stoppage of said capturing of the audio and visual data (708); and incident to stoppage, converting the FMP4 file into the MP4 file through changing the header of the initial moov atom to an mdat designation (710). Directly converting the FMP4 file into an MP4 file using the disclosed in-place conversion dramatically reduces the amount of memory and processing resources needed for such conversion, while, at the same, time capturing the audio/visual data in a format that will survive should a system failure or crash occur.

Some implementations also include storing the FMP4 file with the mdat designation as the MP4 file (806). As such, only the FMP4 file is needed for creation of the MP4 file, using in-place conversion.

Some examples also include assigning at least one fragment header to a portion of the audio and visual data and creating a final moov atom for the MP4 file from the initial moov atom and the at least one fragment header (706). The interspersed fragment headers provide safety if conversion to MP4 is not completed before a crash or system failure, ensuring that at least N−1 fragments are saved for the user.

Some examples also include changing the at least one fragment header to the mdat designation (FIG. 4, 128a-n). Thus, only the FMP4 file is needed for the conversion. No additional files must be created, nor does the audio/video data need to be copied.

Some examples also include creating a final moov atom from the initial moov atom and attaching the final moov atom to the FMP4 file, which also includes the initial moov atom (802). Appending the final moov atom to the FMP4 file provides a way to use the FMP4 file as the MP4 file, instead of copying the entire audio/video data to a new file.

In some examples, the header of the initial moov atom is changed after the final moov atom is attached to the FMP4 file (804). Waiting for the final moov atom to be attached ensures that the MP4 file is written correctly.

In some examples, conversion of the FMP4 file into the MP4 file is done without having to create or copy data to a new file beyond the FMP4 file (124). This saves considerable processing and memory resources for FMP4-to-MP4 conversion.

Some examples also include: assigning at least one fragment header to a portion of the audio and visual data (706); detecting closure of a multimedia application capturing the audio and visual data (716); storing the FMP4 file with the at least one fragment header (714); receiving an instruction to open the stored FMP4 file (122); and initiating the conversion of the FMP4 file into the MP4 file incident to opening the FMP4 file (710). As previously discussed, the fragment headers are useful in saving the FMP4 file if a crash, system failure, or application closure occurs before in-place conversion is completed.

Some examples also include initiating playback of the MP4 file with the initial moov atom changed to the mdat designation (120); and disregarding the initial moov atom and one or more fragment headers of the FMP4 file, due to the mdat designation, during said playback (120). Hiding the initial moov atom and fragments headers finalizes the conversion process and, while adding some additional bytes of data to the MP4 file, conversion takes far less processing and memory resources than traditional conversion.

In some examples, the MP4 file comprises the FMP4 file with the header of the initial moov atom changed to the mdat designation (124). Obfuscation of the initial moov atom allows, in part, the MP4 file to be created from the FMP4 without having to create a new file.

In some examples, capturing of the audio and visual data comprises recording the audio and visual data (110). The examples discussed herein ensure that such recordings, or at least the bulk thereof, are always captured regardless of system failures, application closings, or other interruptions before files are converted to MP4 format.

In some examples, the recording is performed in at least one of a videoconferencing application, a teleconferencing application, or a video-sharing application (110). Adding the in-place conversion discussed herein to such applications enhances the user experience by saving files in the event of system failures, application closings, or other interruptions.

In some examples, the FMP4 file is converted into the MP4 file on a client computing device (100), providing a client-side application that protects user recordings and also saves valuable processing and memory resources.

Other examples are directed to a system for performing in-place conversion of a fragmented MP4 (FMP4) file into an MP4 file (100). The system comprises: memory embodied with a multimedia application configured to convert the FMP4 to the MP4 file (108); and one or more processors programmed to (102): capture audio and visual data for the FMP4 file (702); during said capturing, generate an initial moov atom for the FMP4 file (704), the initial moov atom comprising a header with a moov designation (124); detect stoppage of said capturing of the audio and visual data (708); and incident to stoppage, convert the FMP4 file into the MP4 file through changing the header of the initial moov atom to an mdat designation (710). This system for performing in-place conversion dramatically reduces the amount of memory and processing resources needed for such conversion, while, at the same, time capturing the audio/visual data in a format that will survive should a system failure or crash occur.

In some examples, changing the header of the initial moov atom to the mdat designation is automatically performed by a multimedia application without user intervention (122). Users likely do not care about the conversion of their files, so making in-place conversion automatic only enhances the user experience—or, perhaps, does not hinder the experience.

In some examples, the one or more processors programmed to assign at least one fragment header to a portion of the audio and visual data (706); detect closure of a multimedia application capturing the audio and visual data (716); store the FMP4 file with the at least one fragment header (714); and change a second header for the at least one fragment header to the mdat designation (804). Thus, only the FMP4 file is needed for the conversion. No additional files must be created, nor does the audio/video data need to be copied.

In some examples, capturing of the audio and visual data comprises recording the audio and visual data (110). Adding the disclosed in-place conversion to multimedia applications enhances the user experience by saving audio/video data in FMP4 files and automatically converting the FMP4 files to player-friendly MP4 files.

In some examples, capturing is performed through a recording feature of at least one of a videoconferencing application, a teleconferencing application, or a video-sharing application (110). Such applications may be equipped with the disclosed in-place converter to save processing and memory resources by performing the disclosed in-place conversion of FMP4 files to MP4 files.

Still other examples are directed to one or more computer-storage memory embodied with computer-executable instructions that are executable by at least one processor (102) to perform in-place conversion of a fragmented MP4 (FMP4) file into an MP4 file (108). The memory is embodied with instructions comprising: a multimedia application (120), executable by the at least one processor (102), configured to capture audio and visual data of the FMP4 file and assign an initial moov atom to the FMP4 file (110); and an in-place converter, executable by the at least one processor, configured to convert the FMP4 file into the MP4 file through changing a header of the initial moov atom from a moov designation to an mdat designation (122). By converting the FMP4 to an MP4 file, without having to create a new file and copy data, substantial memory and processing resources are saved.

In some examples, changing of the header of the initial moov atom is performed incident to stoppage of said capturing of the audio and visual data (708), making the in-place conversion automatic and thereby reducing inevitable errors is user intervention were required.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for performing in-place conversion of a fragmented MP4 (FMP4) file into an MP4 file, comprising:
   recording audio and visual data for the FMP4 file;
   generating a moov atom for the FMP4 file while recording the audio and visual data, the moov atom comprising a header with a moov designation;
   detecting stoppage of the recording of the audio and visual data; and
   converting the FMP4 file into the MP4 file, including changing the moov designation in the header of the moov atom to an mdat designation.

2. The method of claim 1, further comprising storing the FMP4 file with the mdat designation as the MP4 file.

3. The method of claim 1, wherein the moov atom is a first moov atom, and wherein the method further comprises:
   assigning a fragment header to a portion of the audio and visual data; and
   creating a second moov atom for the MP4 file from the first moov atom and the fragment header.

4. The method of claim 3, further comprising changing the fragment header to the mdat designation.

5. The method of claim 1, wherein the moov atom is a first moov atom, and wherein the method further comprises:
   creating a second moov atom from the first moov atom; and
   attaching the second moov atom to the FMP4 file.

6. The method of claim 5, wherein the header of the first moov atom is changed after the second moov atom is attached to the FMP4 file.

7. The method of claim 1, wherein conversion of the FMP4 file into the MP4 file is done without having to create or copy data to a new file beyond the FMP4 file.

8. The method of claim 1, further comprising:
   assigning a fragment header to a portion of the audio and visual data;
   detecting closure of a multimedia application recording the audio and visual data;
   storing the FMP4 file with the fragment header;
   receiving an instruction to open the stored FMP4 file; and
   incident to opening the FMP4 file, initiating the converting of the FMP4 file into the MP4 file.

9. The method of claim 1, further comprising:
   initiating playback of the MP4 file with the moov atom changed to the mdat designation.

10. The method of claim 1, wherein the MP4 file comprises the FMP4 file with the header of the moov atom changed to the mdat designation.

11. The method of claim 1, further comprising:
    converting the MP4 file to the FMP4 file, including changing the moov atom from the mdat designation to the moov designation.

12. The method of claim 1, wherein the recording is performed in at least one of a videoconferencing application, a teleconferencing application, or a video-sharing application.

13. The method of claim 1, wherein the FMP4 file is converted into the MP4 file on a client computing device.

14. A system for performing in-place conversion of a fragmented MP4 (FMP4) file into an MP4 file, comprising:
    memory embodied with a multimedia application configured to convert the FMP4 to the MP4 file; and
    a processor programmed to:
    record audio and visual data for the FMP4 file, generate a moov atom for the FMP4 file while recording the audio and visual data, the moov atom comprising a header with a moov designation, detect stoppage of the recording of the audio and visual data, and convert the FMP4 file into the MP4 file, including changing the moov designation in the header of the moov atom to an mdat designation.

15. The system of claim 14, wherein the changing the moov designation in the header of the moov atom to the mdat designation is performed by the multimedia application without user intervention.

16. The system of claim 14, wherein the processor is programmed to:

assign a fragment header to a portion of the audio and visual data;

detect closure of a multimedia application recording the audio and visual data;

store the FMP4 file with the fragment header; and change a second header for the fragment header to the mdat designation.

17. The system of claim 14, wherein the processor is programmed to convert the MP4 file to the FMP4 file, including changing the moov atom from the mdat designation to the moov designation.

18. The system of claim 14, wherein the recording is performed with a recording feature of at least one of a videoconferencing application, a teleconferencing application, or a video-sharing application.

19. A computer-storage memory device embodied with computer-executable instructions that are executable by a processor to perform in-place conversion of a fragmented MP4 (FMP4) file into an MP4 file, comprising:

a multimedia application, executable by the processor, configured to record audio and visual data of the FMP4 file and assign a moov atom to the FMP4 file; and an in-place converter, executable by the processor, configured to convert the FMP4 file into the MP4 file, including changing a header of the moov atom from a moov designation to an mdat designation.

20. The computer-storage memory device of claim 19, wherein the changing of the header of the moov atom is performed incident to stoppage of the recording of the audio and visual data.

* * * * *